US010827006B2

(12) United States Patent
Hiltunen et al.

(10) Patent No.: US 10,827,006 B2
(45) Date of Patent: Nov. 3, 2020

(54) POLICY-DRIVEN HOMING SERVICE SYSTEM

(71) Applicant: AT&T Intellectual Property I, L.P., Atlanta, GA (US)

(72) Inventors: Matti Hiltunen, Morristown, NJ (US); Gueyoung Jung, Belle Mead, NJ (US); Shankaranarayanan Puzhavakath Narayanan, Hillsborough, NJ (US); Joseph D'Andrea, III, Basking Ridge, NJ (US); Kaustubh Joshi, Scotch Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 218 days.

(21) Appl. No.: 15/985,943

(22) Filed: May 22, 2018

(65) Prior Publication Data
US 2019/0364116 A1    Nov. 28, 2019

(51) Int. Cl.
*H04L 29/08*    (2006.01)
*H04L 12/24*    (2006.01)
(Continued)

(52) U.S. Cl.
CPC ......... *H04L 67/16* (2013.01); *G06Q 10/0834* (2013.01); *G06Q 30/0205* (2013.01); *H04L 41/0893* (2013.01); *G06Q 10/087* (2013.01)

(58) Field of Classification Search
CPC . H04L 67/16; H04L 41/0893; H04L 12/4625; H04L 12/46; H04L 12/28;
(Continued)

(56) References Cited

U.S. PATENT DOCUMENTS 8,250,135 B2    8/2012    Driesen et al.
9,251,517 B2    2/2016    Bonilla et al.
(Continued)

FOREIGN PATENT DOCUMENTS

IN    2014DEL0147 A    5/2016
WO    WO 2015/103560    7/2015
(Continued)

OTHER PUBLICATIONS

ECOMP (Enhanced Control, Orchestration, Management & Policy) Architecture White Paper, Author :AT&T Inc. (Year: 2016).*
(Continued)

*Primary Examiner* — Tonia L Dollinger
*Assistant Examiner* — Mehulkumar J Shah
(74) *Attorney, Agent, or Firm* — Hartman & Citrin LLC

(57) ABSTRACT

The concepts and technologies disclosed herein are directed to a policy-driven homing service system that can receive, from a master service orchestrator, a demand specifying a service component to be used to provide, at least in part, a service. The system can receive, from a policy system, a homing constraint. The system can determine, for the demand, an initial set of all potential candidates. The system can apply the homing constraint to each potential candidate in the initial set of all potential candidates. The system can determine a resultant set of potential solutions that satisfy the homing constraint. The system can determine a best solution from the resultant set of potential solutions. The system can send the best solution to the master service orchestrator, which instantiates the demand based upon the best solution.

17 Claims, 7 Drawing Sheets

(51) Int. Cl.
*G06Q 30/02* (2012.01)
*G06Q 10/08* (2012.01)
(58) Field of Classification Search
CPC ..... H04L 41/5041; H04L 67/10; H04L 67/34; H04L 12/2803; H04L 29/08; H04L 12/24; G06Q 30/02; G06Q 10/08; G06Q 10/0834; G06Q 30/0205; G06Q 10/087; G06Q 10/10; G06F 9/455; G06F 9/45533
USPC .............. 709/227, 249; 370/431; 704/270.1; 340/2.9, 208
See application file for complete search history.

(56) References Cited

U.S. PATENT DOCUMENTS

| | | | |
|---|---|---|---|
| 9,270,753 | B2 | 2/2016 | Park et al. |
| 9,342,367 | B2 | 5/2016 | Koneti et al. |
| 9,349,025 | B2 | 5/2016 | Karaoguz et al. |
| 9,473,374 | B2 | 10/2016 | Beaty et al. |
| 9,495,211 | B1 | 11/2016 | Helstroom et al. |
| 9,563,479 | B2 | 2/2017 | Ferris et al. |
| 9,634,956 | B2 | 4/2017 | Xu et al. |
| 9,870,238 | B2 | 1/2018 | Astete et al. |
| 9,935,955 | B2 | 4/2018 | Desai et al. |
| 2012/0221454 | A1 | 8/2012 | Morgan |
| 2013/0111033 | A1* | 5/2013 | Mao ............... G06F 9/5072 709/226 |
| 2015/0067171 | A1 | 3/2015 | Yum et al. |
| 2015/0235308 | A1 | 8/2015 | Mick et al. |
| 2016/0057075 | A1* | 2/2016 | Parikh ............ H04L 47/762 709/226 |
| 2016/0063077 | A1 | 3/2016 | Pyke et al. |
| 2016/0112453 | A1 | 4/2016 | Martinez et al. |
| 2016/0191345 | A1 | 6/2016 | Despotovic et al. |
| 2016/0277250 | A1 | 9/2016 | Maes |
| 2018/0063021 | A1 | 3/2018 | Beveridge et al. |
| 2019/0349275 | A1* | 11/2019 | Chen ............... H04L 12/403 |
| 2019/0364116 | A1* | 11/2019 | Hiltunen ............ H04L 67/16 |

FOREIGN PATENT DOCUMENTS

| | | |
|---|---|---|
| WO | WO 2016/096534 | 6/2016 |
| WO | WO 2016/109845 | 7/2016 |
| WO | WO 2016/183253 | 11/2016 |
| WO | WO 2017/114757 | 7/2017 |
| WO | WO 2018/014972 | 1/2018 |

OTHER PUBLICATIONS

ECOMP (Enhanced Control, Orchestration, Management & Policy) Architecture White Paper, Author :AT&T Inc. (Year: 2016) (Year: 2016).*

Kourtis et al., "T-NOVA: An Open-Source MANO Stack for NFV Infrastructures," IEEE Transactions on Network and Service Management, Jul. 2017, pp. 586-602, IEEE 2017.

Tordsson et al., "Cloud brokering mechanisms for optimized placement of virtual machines across multiple providers," Future Generation Computer Systems, Jun. 10, 2011, pp. 358-367.

Ferrer et al., "OPTIMIS: A holistic approach to cloud service provisioning," Future Generation Computer Systems, Jul. 21, 2011, pp. 66-77, Elsevier B.V. 2011.

Li et al., "Modeling for Dynamic Cloud Scheduling via Migration of Virtual Machines," 2011 IEEE Third International Conference on Cloud Computing Technology and Science, Nov. 29-Dec. 1, 2011, pp. 163-171, IEEE 2011.

Grit et al., "Virtual Machine Hosting for Networked Clusters: Building the Foundations for 'Autonomic' Orchestration," Proceedings of the $2^{nd}$ International Workshop on Virtualization Technology in Distributed Computing, Nov. 17, 2006, IEEE Computer Society 2006.

Lucas-Simarro et al., "Cost optimization of virtual infrastructures in dynamic multi-cloud scenarios," Concurrency and Computation: Practice and Experience, Jun. 25, 2015 (first published Dec. 7, 2012), vol. 27, Issue 9, pp. 2260-2277.

* cited by examiner

POLICY-DRIVEN HOMING SERVICE SYSTEM

BACKGROUND

Network functions virtualization ("NFV") is a new technology initiative that aims to move traditional and evolving mobility networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware.

Software-defined network ("SDN") is an architectural framework that provides a software-centric cloud environment for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits over traditional networks. SDN allows for the creation of multiple virtual network control planes on common hardware. SDN helps extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

Combining SDN and NFV functionality, such as in Domain 2.0, available from AT&T, provides a highly complex and dynamic set of relationships between virtual, logical, and physical resources. Networks, such as embodied in Domain 2.0 deployments, provide intelligent software systems and applications operating on general purpose commodity hardware (e.g., COTS). This not only drives down capital expenditures, ongoing operational costs, and helps to configure networks with less human intervention, but also creates significant opportunities to scale and monetize existing and new intelligent services.

Within service providers, such as AT&T, orchestration systems like control, orchestration, management, and policy ("ECOMP") have been created to dramatically reduce monotonous tasks and monitoring required by human operators through data-based analytics. Current orchestration systems often incite frustration among operators due to over-complicated network status readouts, non-specific network manipulations automatically performed by the orchestration system, and the inability to quickly "revert" changes caused by such manipulations. AT&T's ECOMP has been combined with the Open Orchestrator Project ("OPEN-O") to create the Open Network Automation Platform ("ONAP") project supported by the Linux Foundation. ONAP is an open source software platform that delivers capabilities for the design, creation, orchestration, monitoring, and life cycle management of SDNs and the VNFs operating therein, as well as higher-level services that utilize the functionality of SDN/VNF. ONAP provides automatic, policy-driven interaction of these functions and services in a dynamic, real-time cloud environment. ONAP also provides graphical design tools for function/service creation.

SUMMARY

Concepts and technologies disclosed herein are directed to a policy-driven homing service system. According to one aspect of the concepts and technologies disclosed herein, the policy-driven homing service system ("homing service system") can include a processor and memory. The memory can include computer-executable instructions that, when executed by the processor, cause the processor to perform operations. In particular, the homing service system can receive, from a master service orchestrator, a demand specifying a service component to be used to provide, at least in part, a service. The homing service system can receive from a policy system, a homing constraint. The homing service system can determine, for the demand, an initial set of all potential candidates to which to home the service component. The homing service system can apply, for the demand, the homing constraint to each potential candidate in the initial set of all potential candidates. The homing service system can determine, for the demand, a resultant set of potential solutions that satisfy the homing constraint. The homing service system can determine, for the demand, a best solution from the resultant set of potential solution. The homing service system can send the best solution to the master service orchestrator, which instantiates the demand based upon the best solution. In some embodiments, the homing service system can receive multiple demands, each of which corresponds to a different service component to be used to provide, at least in part, a service to one or more customers. The service component identified in the demand can be a VNF, a network connector, or other resource to provide, at least in part, the service.

The homing constraints can include constraints from different constraint categories, such as, service requirements, optimization objectives, runtime metrics, runtime queries, and cloud capabilities. The service requirements can include, for example, requirements with regard to latency, distance, regulatory, bandwidth, proximity and colocation (both physical and virtual), security, and diversity (e.g., disaster zones). The optimization objectives can include objectives to be met by the requested service with regard to customer latency, customer distance, provider costs, and provider load balancing, for example. The runtime metrics can include any metrics established as a target for the requested service to meet during runtime. The runtime queries can include capacity checks, quota checks, and/or other queries with regard to any of the runtime metrics to be measured for the requested service during runtime. The cloud capabilities can define the capabilities the requested service needs to operate successfully in its deployment environment. Some examples of the cloud capabilities include, but are not limited to, site reliability, cluster software capabilities (e.g., availability zones and affinity/anti-affinity rules), cluster hardware capabilities (e.g., single root input/output virtualization ("SRIOV"), hardware encryption, transcoding, and non-uniform memory access ("NUMA") boundaries), aggregate capacity (e.g., tenant capacity and host capacity), and aggregate utilization (e.g., tenant utilization and host utilization).

In some embodiments, the homing service system can receive the demand in response to the master service orchestrator receiving a service request from an ordering application executed by a customer computer system for a new instance of the service. In some other embodiments, the homing service can receive the demand in response to the master service orchestrator receiving a service change request from a customer to change an existing instance of the service.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1A:
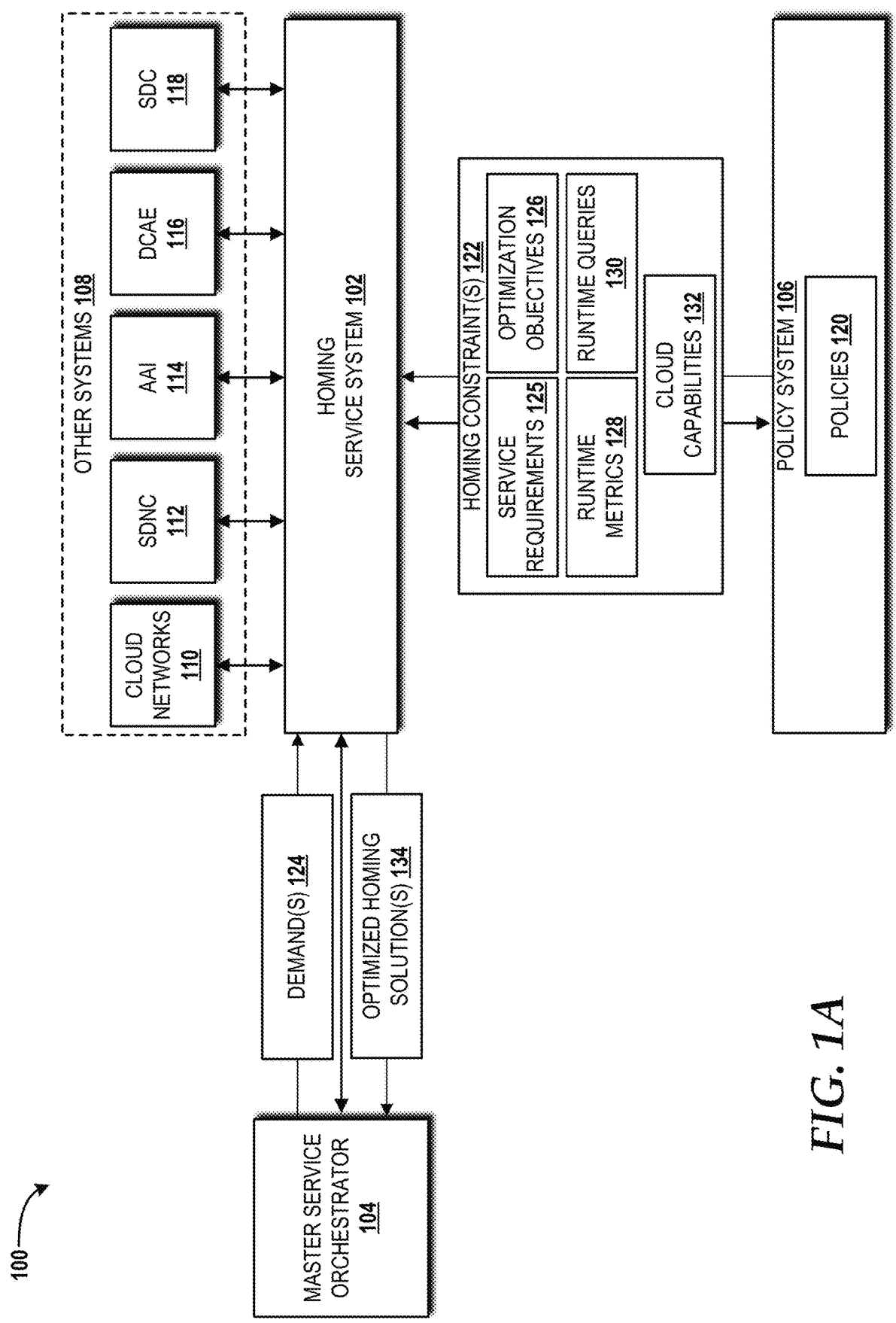
FIGS. 1A-1B are block diagrams illustrating aspects of an operating environment in which aspects of embodiments of the concepts and technologies disclosed herein can be implemented.

Turning now to FIG. 1A, a block diagram illustrating aspects of an operating environment 100 in which embodiments of the concepts and technologies disclosed herein can be implemented will be described. The illustrated operating environment 100 includes a homing service system 102 that provides an optimizing constraint-solving placement service (referred to herein as "homing service") that allows ONAP to deploy services automatically across multiple sites and/or multiple clouds. The homing service system 102 enables resource homing based upon a wide variety of policy constraints, including, but not limited to, capacity, location, platform capability, and other service specific constraints.

The illustrated homing service system 102 is in communication with a master service orchestrator 104, a policy system 106, and other systems 108 (e.g., ECOMP components). The illustrated other systems 108 include one or more cloud networks 110, an SDN controller ("SDNC") 112, an active and available inventory ("AAI") subsystem 114, a review data collection, analytics, and events ("DCAE") subsystem 116, and a service design and creation ("SDC") subsystem 118. The other systems 108 can include other ECOMP components, other systems, other subsystems, and/or other networks that, in some combination, are used, at least in part, to design, deploy, change, and otherwise control one or more services homed by the homing service system 102.

The homing service system 102 is extensible to accommodate a growing set of homing objectives, policy constraints, data sources, and placement algorithms. The homing service system 102 is also service-agnostic by design and can easily onboard new services with minimal effort. Therefore, the homing service system 102 can be extended to a general policy-driven optimizing placement platform for wider range of services (e.g., DCAE micro-services, ECOMP control loops, server capacity, and the like). The homing service system 102 also provides a traceable mechanism for what-if analysis, which is critical for ease of understanding a homing recommendation and resolving infeasibility scenarios.

The master service orchestrator 104 performs ONAP orchestration functions, including arranging, sequencing, and implementing tasks based upon rules and/or policies to coordinate the creation, modification, or removal of logical and physical resources in a managed environment, such as provided by the cloud network(s) 110. The master service orchestrator 104 manages orchestration at the top level and facilitates additional orchestration among lower level controllers, such as the SDNC 112.

The master service orchestrator 104 performs end-to-end service instance provisioning. The master service orchestrator 104 can instantiate and release VNFs, as well as perform migration and relocation of VNFs in support of end-to-end service instantiation, operations, and management. The master service orchestrator 104 can be triggered by service requests received from the SDC 118, as will be described in greater detail below.

The master service orchestrator 104 is aware of the state of lower level service controllers. For example, in some embodiments, the master service orchestrator 104 is in communication with VNF controllers that control, at least in part, the operation of one or more VNFs at the nodal or VNF pool layer. These VNF-specific and VNF pool-specific service controllers are tracked by the master service orchestrator 104 to maintain synchronized states to extract information. The master service orchestrator 104 uses this information to dynamically allocate and/or alter the resource utilization on-demand within a given VNF or across multiple VNFs during the course of network changes or upgrades, error conditions, failover situations, and the like.

The policy system 106 is a subsystem of ONAP that creates and manages policies 120. The policies 120 are used to control, influence, and help ensure compliance with one or more goals. Goals can be defined for various aspects of the operating environment 100, including goals to support infrastructure, specific products and/or service offerings, operation automation, security, audit, and/or other aspects of the operating environment 100 based, at least in part, upon input received from users, such as network and/or service designers, operations engineers, security experts, customers, developers, and the like. In context of the homing service provided by the homing service system 102, the policies 120 can create, at least in part, one or more homing constraints 122 that should be provided, evaluated, maintained, and/or enforced for a given service instance.

The cloud networks 110 host one or more services orchestrated by the master service orchestrator 104 on resources of a network functions virtualization ("NFV") platform 200 (best shown in FIG. 2) homed via the homing service of the homing service system 102. The services can be any type of cloud service or combination of cloud services, including, for example, Infrastructure as a Service ("IaaS"), Platform as a Service ("PaaS"), and/or Software as a Service ("SaaS").

The SDNC 112 manages the state of one or more SDN networks, such as deployed as or inclusive in the cloud networks 110, and/or specific resources thereof. The SDNC 112 can communicate with the master service orchestrator 104, the AAI subsystem 114, the DCAE subsystem 116, and/or other external systems 108 not illustrated. The SDNC 112 can instantiate, maintain, and otherwise control VNFs to provide, at least in part, services orchestrated by the master service orchestrator 104. The SDNC 112 can also perform network configuration workflows and can report network status to the AAI subsystem 114 and the master service orchestrator 104.

The AAI subsystem 114 is an ONAP subsystem that provides real-time view of resources, services, and the relationships therebetween. The AAI subsystem 114 forms a registry of active, available, and assigned assets, and also maintains up-to-date views of relationships among assets, including any relevance to different components of ONAP.

The DCAE subsystem 116 is an ONAP subsystem that supports closed loop control and high-level correlation for business and operations activities. The DCAE subsystem 116 collects performance, usage, and configuration data. The DCAE subsystem 116 provides computation of analytics. The DCAE subsystem 116 also aids in troubleshooting and management. The DCAE subsystem 116 publishes events, data, and analytics to other ONAP subsystems.

The SDC subsystem 118 is an ONAP subsystem that provides an online catalog of virtual parts for service designers to create new reusable building blocks and combine those blocks in different ways to build new services. There are two basic types of building blocks: VNFs and network connectors. A service designer 136 (best shown in FIG. 1B) can select existing VNFs and/or network connectors, or add new VNFs and/or network connectors, and then drag-and-drop the selected building blocks onto a palette and connect the building blocks to build a new service.

Given one or more demands 124 (based upon decomposed service components) received from the master service orchestrator 104 and constraints for meeting the demands 124 through placement of the decomposed service components in accordance with the homing constraints 122 received from the policy system 106, the homing service system 102 determines one or more optimized homing solutions 134 to be used by the master service orchestrator 104 to home the decomposed service components in accordance with all service requirements for a requested service deployment.

The homing constraints 122 received from the policy system 106 can include constraints from different constraint categories, such as, service requirements 125, optimization objectives 126, runtime metrics 128, runtime queries 130, and cloud capabilities 132, as shown in the illustrated example. The service requirements 125 can include, for example, requirements with regard to latency, distance, regulatory, bandwidth, proximity and colocation (both physical and virtual), security, and diversity (e.g., disaster zones). The optimization objectives 126 can include objectives to be met by the requested service with regard to customer latency, customer distance, provider costs, and provider load balancing, for example. The runtime metrics 128 can include any metrics established as a target for the requested service to meet during runtime. The runtime queries 130 can include capacity checks, quota checks, and/or other queries with regard to any of the runtime metrics 128 to be measured for the requested service during runtime. The cloud capabilities 132 can define the capabilities the requested service needs to operate successfully in its deployment environment. Some examples of the cloud capabilities 132 include, but are not limited to, site reliability, cluster software capabilities (e.g., availability zones and affinity/anti-affinity rules), cluster hardware capabilities (e.g., single root input/output virtualization ("SRIOV"), hardware encryption, transcoding, and non-uniform memory access ("NUMA") boundaries), aggregate capacity (e.g., tenant capacity and host capacity), and aggregate utilization (e.g., tenant utilization and host utilization). The homing service system 102 can utilize a plug-in approach to allow an extensible set of constraints and data models for new systems added to the other systems 108.

Figure 1B:
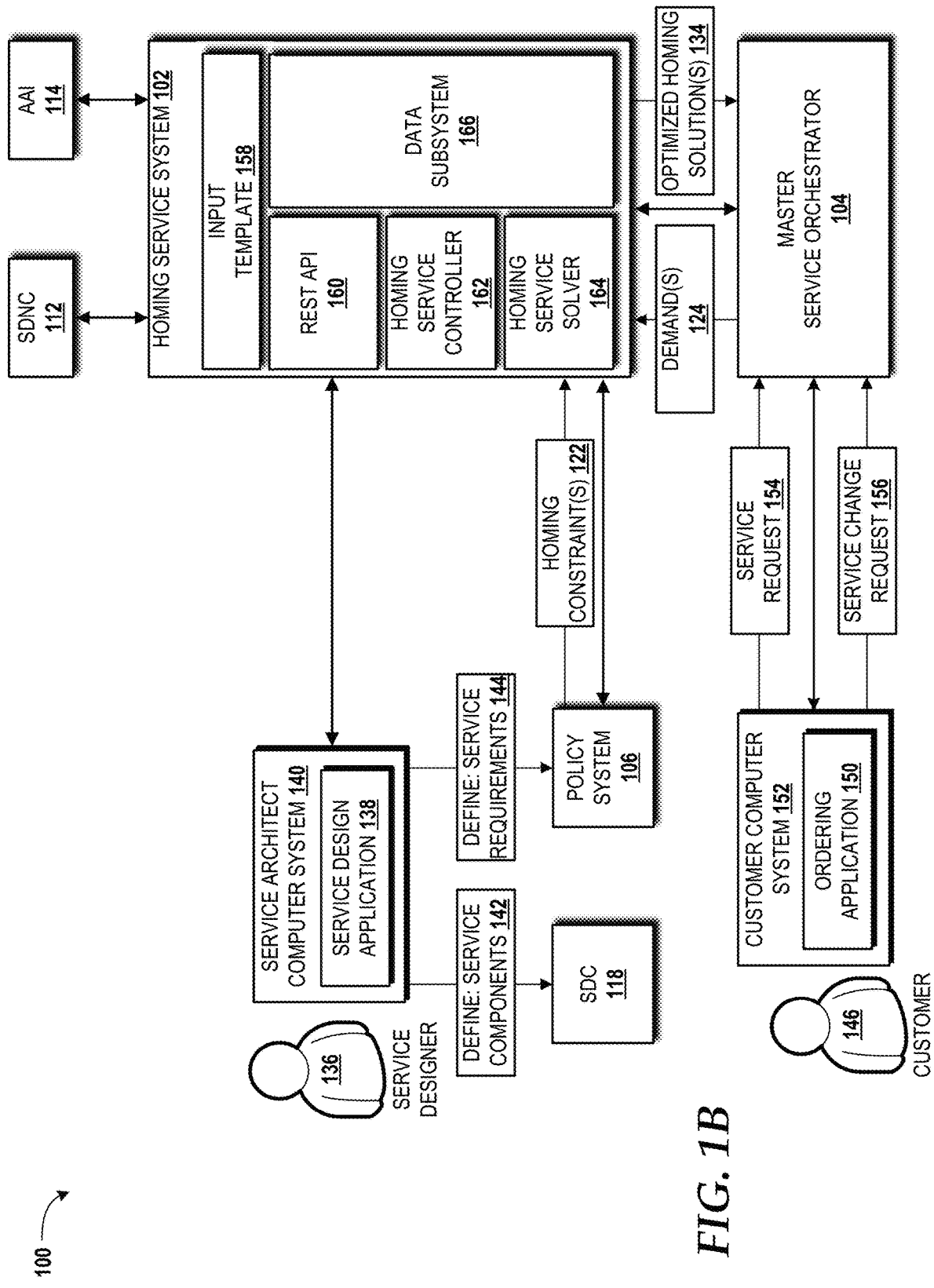

Turning now to FIG. 1B, additional details of the operating environment 100 will be described. In addition to the numbered elements shown in FIG. 1A, the illustrated operating environment 100 also includes a service designer 136 who can use a service design application 138 executed by a service architect computer system 140 to define, for the SDC 118, one or more service components (142) (e.g., building blocks—VNFs and/or network connectors) for a new service and to define, for the policy system 106, one or more service requirements (144) such as one or more service requirements 125 and one or more optimization objectives 126 (best shown in FIG. 1A). The service design application 138 can be embodied as a native application or a web application that provides an interface to the SDC 118 and the policy system 106.

The illustrated operating environment 100 also includes a customer (or customer service representative) 146 who can use an ordering application 150 executed by a customer computer system 152 to request an instantiation of a new service instance via a service request 154. In response to receiving the service request 154, the master service orchestrator 104 can determine the service components 142 needed to instantiate a new service instance for the service identified in the service request 154 and notify the homing service system 102 of the service components 142 via the demands 124. The homing service system 102 can use the demands 124 received from the master service orchestrator 104 and the homing constraints 122 received from the policy system 106 to determine the optimized homing solution 134. The homing service system 102 can provide the optimized homing solution 134 to the master service orchestrator 104, which, in turn, homes the service components 142 (e.g., to be executed by specific resources of the cloud network(s) 110) to instantiate a new service instance for the requested service.

The embodiments disclosed herein are primarily directed to homing demands, such as VNFs in ECOMP/ONAP environment. The homing service system 102 additionally or alternatively can be used to "home" other systems. For example, a system dispatching technicians to handle customer requests could use the homing service system 102 to determine which technician should handle the request (in this example, the technicians are the candidates). Similarly, a police/drone dispatch system could use the homing service system 102 to determine which drone to send to a specific location (e.g., if gunshot is detected at a location)—here, the candidates could be the drones/police cars.

The customer 146 can also use the ordering application 150 to request one or more changes to an existing service instance via a service change request 156. In response to receiving the service change request 156, the master service orchestrator 104 can determine the service components 142 that should be rehomed and can notify the homing service system 102 of the service components 142 via the demands 124. The homing service system 102 can use the demands 124 received from the master service orchestrator 104 and the homing constraints 122 received from the policy system 106 to determine the optimized homing solution 134 to accommodate the service change request 156. The homing service system 102 can provide the optimized homing solution 134 (an optimized rehoming solution in this example) to the master service orchestrator 104, which, in turn, rehomes the service components 142 (e.g., to be executed by specific resources of the cloud network(s) 110) in accordance with the optimized homing solution 134.

The illustrated homing service system 102 includes an input template 158, a representational state transfer ("REST") application programming interface ("API") 160, a homing service controller 162, a homing service solver 164, and a data subsystem 166. The homing constraints 122 and the demands 124 can be received by the homing service system 102 via the input template 158. The REST API 160 can be exposed by the homing service system 102 to allow upstream systems to call functions provided by the homing service system 102. The homing service controller 162 can check the input template 158, resolve a location of the customer 146 (e.g., for site and/or cloud selection), and can populate an initial set of candidate solutions (best shown in FIG. 4) from which the optimized homing solution 134 can be selected.

Figure 4:
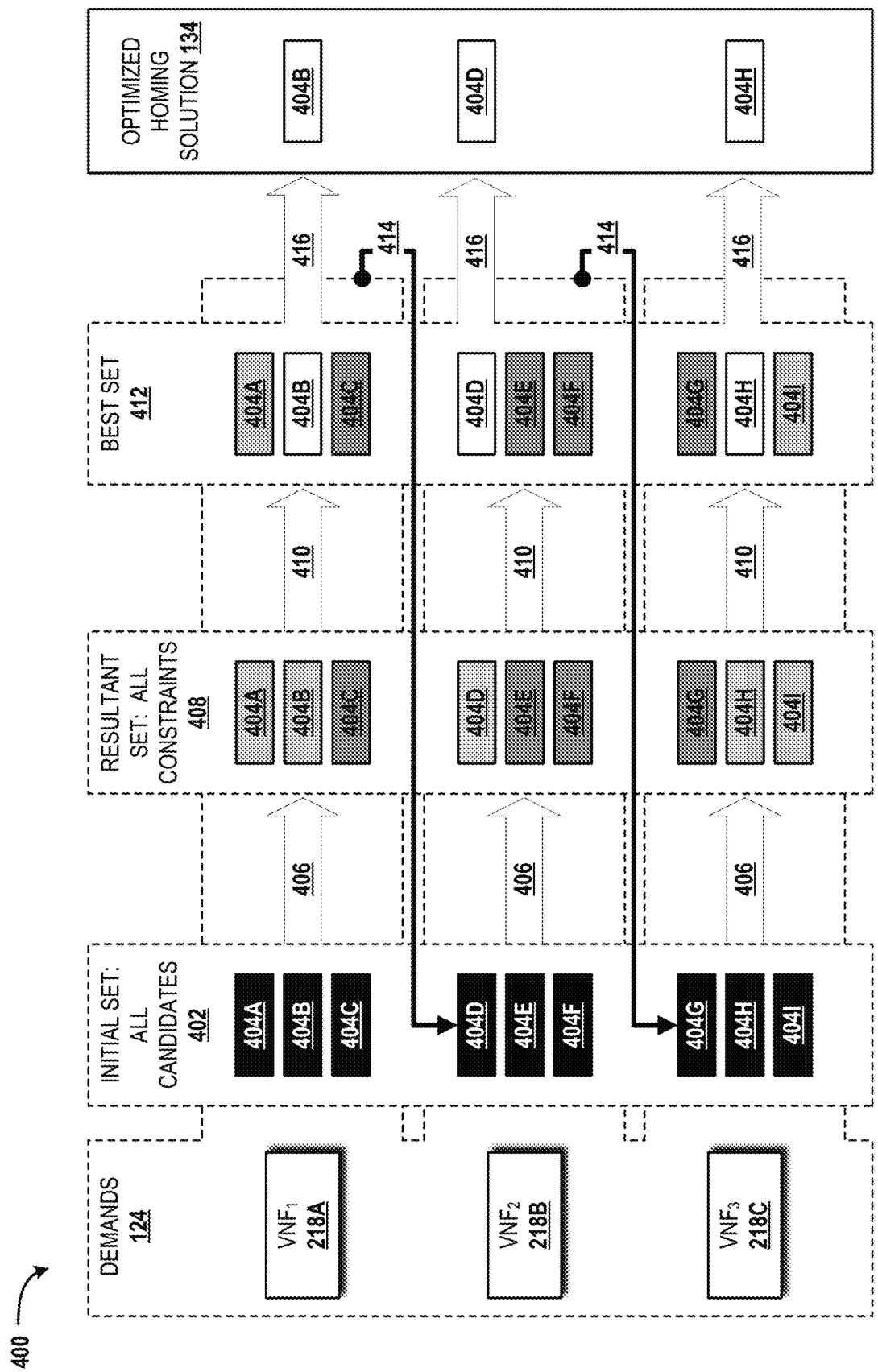
FIG. 4 is a diagram illustrating an example heuristic greedy algorithm of the homing service, according to an illustrative embodiment.

The homing service solver 164 solves the homing constraints 122 and determines the optimized homing solution 134 for the demands 124. The homing service solver 164 (example implementation illustrated in FIG. 4) starts with the initial candidate sets and then starts applying the constraints to eliminate possible candidates and compares the possible solutions to the homing problem using the objective function. For example, as illustrated in FIG. 4, one possible solving algorithm implemented by the homing service solver 164 picks a demand, evaluates the initial candidates for the demand, and out of the initial candidates that pass all the constraints, the algorithm picks the candidate that minimizes the objective function (e.g., closest distance to the customer 146). The algorithm then considers the second demand and evaluates the constraints for the candidates for the second demand while considering the tentative solution for the first demand. It should be understood that many constraints are pair-wise; for example, the solutions for demands 1 and 2 must be within 100 miles of one another (or in the same/different data center, same/different state/country/geopolitical region, within a certain network latency, etc). Thus, the prior selection of the solution to the first demand may eliminate many candidates for the second demand. Out of the candidates that pass all constraints, the best one is again selected. This process is repeated until a full solution is found (i.e., all demands have a selected candidate) or the search reaches a dead-end (i.e., no remaining candidates for a demand). In case of a dead-end, this example algorithm will backtrack the search to the previous demand and pick the second best candidate and see if this will help find a full solution. This process is repeated until a solution is found or there are no more remaining candidates to consider for the first demand. Those skilled in the art will appreciate many other search algorithms are possible for implementation by the homing service solver 164. As such, the example described above should not be interpreted as being limiting in any way.

The data subsystems 166 interacts with other systems and components, such as the SDNC 112 and the AAI subsystem 114 to retrieve information or to request evaluation of a constraint. For example, the AAI subsystem 114 is used to retrieve the possible cloud sites to where a demand could be homed, including the geographic location of the cloud site, the cloud site's owner/provider (e.g., private versus public or third party cloud site), and/or the cloud site's hardware capabilities (e.g., single root input/output virtualization ("SR-IOV")). Similarly, the AAI subsystem 114 is used to retrieve existing VNF instances that can be used to home a demand. Many VNFs support multi-tenancy and allow multiple customers to use the same VNF instance, for example, a content distribution network ("CDN") server. Other VNF types may not support multiple different customers but they support multiple different customer locations belonging to the same customer company. For these existing VNF instances, the data subsystem 166 also retrieves the location information. Many other constraint types may rely on information that is stored in the AAI 114, for example, any predefined grouping/pairing constraints between VNF instances. The data subsystem 166 retrieves such information when needed to evaluate the constraint related to that pairing/grouping. Some external subsystems (e.g., one or more of the other systems 108) may provide a query interface to evaluate a candidate property. For example, the SDNC 112 may provide an API to evaluate if an existing VNF instance has enough remaining capacity to support a new customer. Other examples of such queries would involve a check API to determine if a cloud site has sufficient capacity for a new VNF or if a tenant in a cloud site has enough remaining quota to deploy a VNF. Any constraints that rely on real-time measurements (e.g., cloud site utilization, latency between locations, etc.) could use the data subsystem 166 to retrieve the needed measurements from the DCAE 116.

Figure 2:
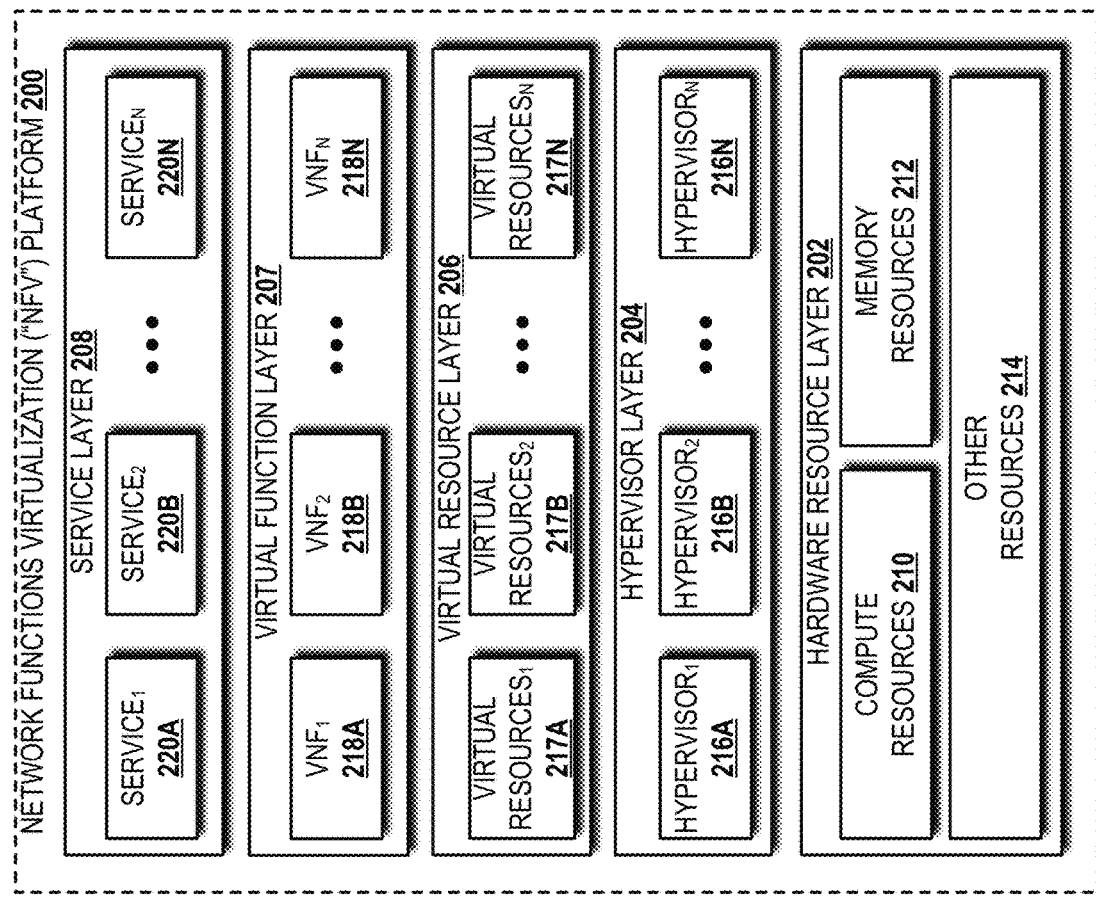
FIG. 2 is a block diagram illustrating aspects of an illustrative network functions virtualization ("NFV") platform capable of implementing aspects of embodiments of the concepts and technologies disclosed herein.

Turning now to FIG. 2, an illustrative NFV platform 200 will be described, according to an illustrative embodiment. The NFV platform 200 includes a hardware resource layer 202, a hypervisor layer 204, a virtual resource layer 206, a virtual function layer 207, and a service layer 208. While no connections are shown between the layers illustrated in FIG. 2, it should be understood that some, none, or all of the components illustrated in FIG. 2 can be configured to interact with one another to carry out various functions described herein. In some embodiments, the components are arranged so as to communicate via one or more networks. Thus, it should be understood that FIG. 2 and the remaining description are intended to provide a general understanding of a suitable environment in which various aspects of the embodiments described herein can be implemented and should not be construed as being limiting in any way.

The hardware resource layer 202 provides hardware resources. In the illustrated embodiment, the hardware resource layer 202 includes one or more compute resources 210, one or more memory resources 212, and one or more other resources 214.

The compute resource(s) 210 can include one or more hardware components that perform computations to process data and/or to execute computer-executable instructions of one or more application programs, one or more operating systems, and/or other software. In particular, the compute resources 210 can include one or more central processing units ("CPUs") configured with one or more processing cores. The compute resources 210 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 210 can include one or more discrete GPUs. In some other embodiments, the compute resources 210 can include CPU and GPU components that are configured in accordance with a co-processing CPU/GPU computing model, wherein the sequential part of an application executes on the CPU and the computationally-intensive part is accelerated by the GPU processing capabilities. The compute resources 210 can include one or more system-on-chip ("SoC") components along with one or more other components, including, for example, one or more of the memory resources 212, and/or one or more of the other resources 214. In some embodiments, the compute resources 210 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 210 can be or can include one or more hardware components architected in accordance with an ARM architecture, available for license from ARM HOLDINGS of Cambridge, United Kingdom. Alternatively, the compute resources 210 can be or can include one or more hardware components architected in accordance with an x86 architecture, such an architecture available from INTEL CORPORATION of Mountain View, Calif., and others. Those skilled in the art will appreciate the implementation of the compute resources 210 can utilize various computation architectures, and as such, the compute resources 210 should not be construed as being limited to any particular computation architecture or combination of computation architectures, including those explicitly disclosed herein.

The memory resource(s) 212 can include one or more hardware components that perform storage/memory operations, including temporary or permanent storage operations. In some embodiments, the memory resource(s) 212 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 210.

The other resource(s) 214 can include any other hardware resources that can be utilized by the compute resources(s) 210 and/or the memory resource(s) 212 to perform operations described herein. The other resource(s) 214 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 202 can be virtualized by one or more hypervisors 216A-216N (also known as "virtual machine monitors") operating within the hypervisor layer 204 to create virtual resources that reside in the virtual resource layer 206. The hypervisors 216A-216N can be or can include software, firmware, and/or hardware that alone or in combination with other software, firmware, and/or hardware, creates and manages virtual resources 217A-217N operating within the virtual resource layer 206.

The virtual resources 217A-217N operating within the virtual resource layer 206 can include abstractions of at least a portion of the compute resources 210, the memory resources 212, and/or the other resources 214, or any combination thereof. In some embodiments, the abstractions can include one or more virtual machines, virtual volumes, virtual networks, and/or other virtualized resources upon which one or more VNFs 218A-218N can be executed. The VNFs 218A-218N in the virtual function layer 207 are constructed out of the virtual resources 217A-217N in the virtual resource layer 206. In the illustrated example, the VNFs 218A-218N can provide, at least in part, one or more services 220A-220N in the service layer 208.

Figure 3:
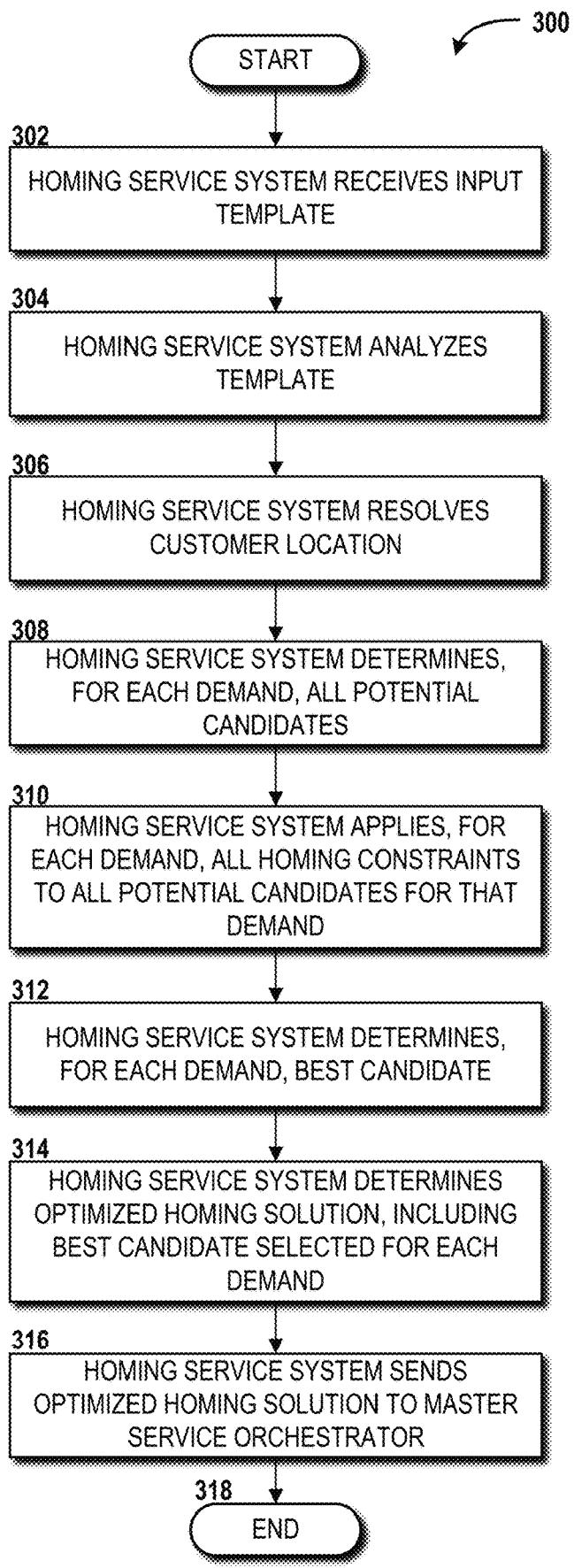
FIG. 3 is a flow diagram illustrating aspects of a method for performing a homing service, according to an illustrative embodiment.

Turning now to FIG. 3, aspects of a method 300 for providing a homing service will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

The method 300 will be described with reference to FIG. 3 and additional reference to FIGS. 1A-1B. The method 300 begins and proceeds to operation 302, where the homing service system 102 receives the input template 158 responsive to either the service request 154 or the service change request 156. From operation 302, the method 300 proceeds to operation 304, where the homing service system 102, via the homing service controller 162, analyzes the input template 158 to determine the demands 124 and the homing constraints 122 contained therein. From operation 304, the method 300 proceeds to operation 306, where the homing service system 102, via the homing service controller 162, resolves the location of the customer 146 to determine which of the cloud networks 110 and, if applicable, which site within the cloud network 110 to which to home the requested service.

From operation 306, the method 300 proceeds to operation 308, where the homing service system 102, via the homing service controller 162, determines, for each of the demands 124, all potential candidates. The potential candidates are defined by one or more of the policies 120 that specify the inventory provider from which the candidates can be retrieved (e.g., the AAI 114), (2) the types of the candidates (e.g., for a particular demand, the homing service controller 162 may only consider existing VNF instances as the candidates, for another one only the cloud locations, and for a third one both VNF instances and cloud location), and (3) a set of attributes that can be used to filter or select candidates from the inventory (e.g., the type of the VNF, status fields of the candidate, country, etc). The homing service controller 162 uses the homing service data subsystem 166 to retrieve the candidates using appropriate queries to the inventory provider systems. From operation 308, the method 300 proceeds to operation 310, where the homing service system 102, via the homing service solver 164, applies, for each of the demands 124, all of the homing constraints 122 to all potential candidates for that demand.

From operation 310, the method 300 proceeds to operation 312, where the homing service system 102, via the homing service solver 164, selects, for each of the demands 124, a best candidate. The best candidate is determined by evaluating the objective function. For example, if the objective function dictates that the homing service system 102 should home the VNFs as close to the customer location as possible, the best candidate for each demand is the closest candidate to the customer location. From operation 312, the method 300 proceeds to operation 314, where the homing service system 102 determines the optimized homing solution 134, including the best candidate selected for each of the demands 124. From operation 314, the method 300 proceeds to operation 316, where the homing service system 102 sends the optimized homing solution 134 to the master service orchestrator 104. From operation 316, the method 300 proceeds to operation 318, where the method 300 ends.

Turning now to FIG. 4, a block diagram 400 illustrating an example heuristic greedy algorithm executed by the homing service system 102 to determine the optimized homing solution 134 for the demands 124, according to an illustrative embodiment. The illustrated example assumes the homing service system 102 has identified the demands 124 for a new service request that requires three VNFs 218A-218C to be instantiated subject to the homing constraints 122. The homing service system 102 determines, for each of the demands 124, an initial set 402 of all potential candidates, including: for the first VNF 218A, the homing service system 102 determines potential candidates 404A-404C; for the second VNF 218B, the homing service system 102 determines potential candidates 404D-404F; and for the third VNF 218C, the homing service system 102 determines potential candidates 404G-404I.

The homing service system 102 then applies, for each of the demands 124, all of the homing constraints 122 (generally shown at 406) to determine a resultant set 408 of potential candidates that meet all of the homing constraints 122, including: for the first VNF 218A, the homing service system 102 determines that the potential candidates 404A-404B meet all of the homing constraints 122; for the second VNF 218B, the homing service system 102 determines that the potential candidate 404D meets all of the homing constraints 122; and for the third VNF 218C, the homing service system 102 determines that the potential candidates 404H-404I meet all of the homing constraints 122.

The homing service system 102 then selects (generally shown at 410), for each of the demands 124, a best candidate to determine a best set 412 of potential candidates that meet all of the homing constraints 122, including: for the first VNF 218A, the homing service system 102 selects the potential candidate 404B as the best candidate; for the second VNF 218B, the homing service system 102 selects the potential candidate 404D as the best candidate; and for the third VNF 218C, the homing service system 102 selects the potential candidate 404I1 as the best candidate. In some embodiments, the homing service system 102 can apply any of the homing constraints 122 that relate a given demand to all previously-solved demands (generally shown at 414).

It should be understood that the homing constraints can be pair-wise—that is, the homing constraints can apply to two or more demands. For example, the constraints may address distance, latency, and/or other metrics between demands (e.g., candidate for demand 1 must be within 10 miles of the candidate for demand 2). The homing constraints may also address affinity or anti-affinity between demands. For example, the candidate for demand 1 has to be placed in a different data center than the candidate for demand 2. Therefore, each demand cannot be solved independently, but in a sequence as presented in the illustrated example shown in FIG. 4 (operation 414), and if the initial best candidate for the earlier demands (e.g., the VNF 218A) results in no solution being found for the following demands (e.g., the VNF 218B), the search process should backtrack and consider the second best candidate for the VNF 218A.

The homing service system 102 determines (generally shown at 416) the optimized homing solution 134 for the requested service. In the illustrated example, the optimized homing solution 134 includes: the potential candidate 404B for the first VNF 218A; the potential candidate 404D for the second VNF 218B; and the potential candidate 404H for the third VNF 218C. The homing service system 102 then sends the optimized homing solution 134 to the master service orchestrator 104. The master service orchestrator 104 homes (or rehomes depending upon service request/service change request) to resources associated with the potential candidates 404B, 404D, 40411 in accordance with the optimized homing solution 134.

Figure 5:
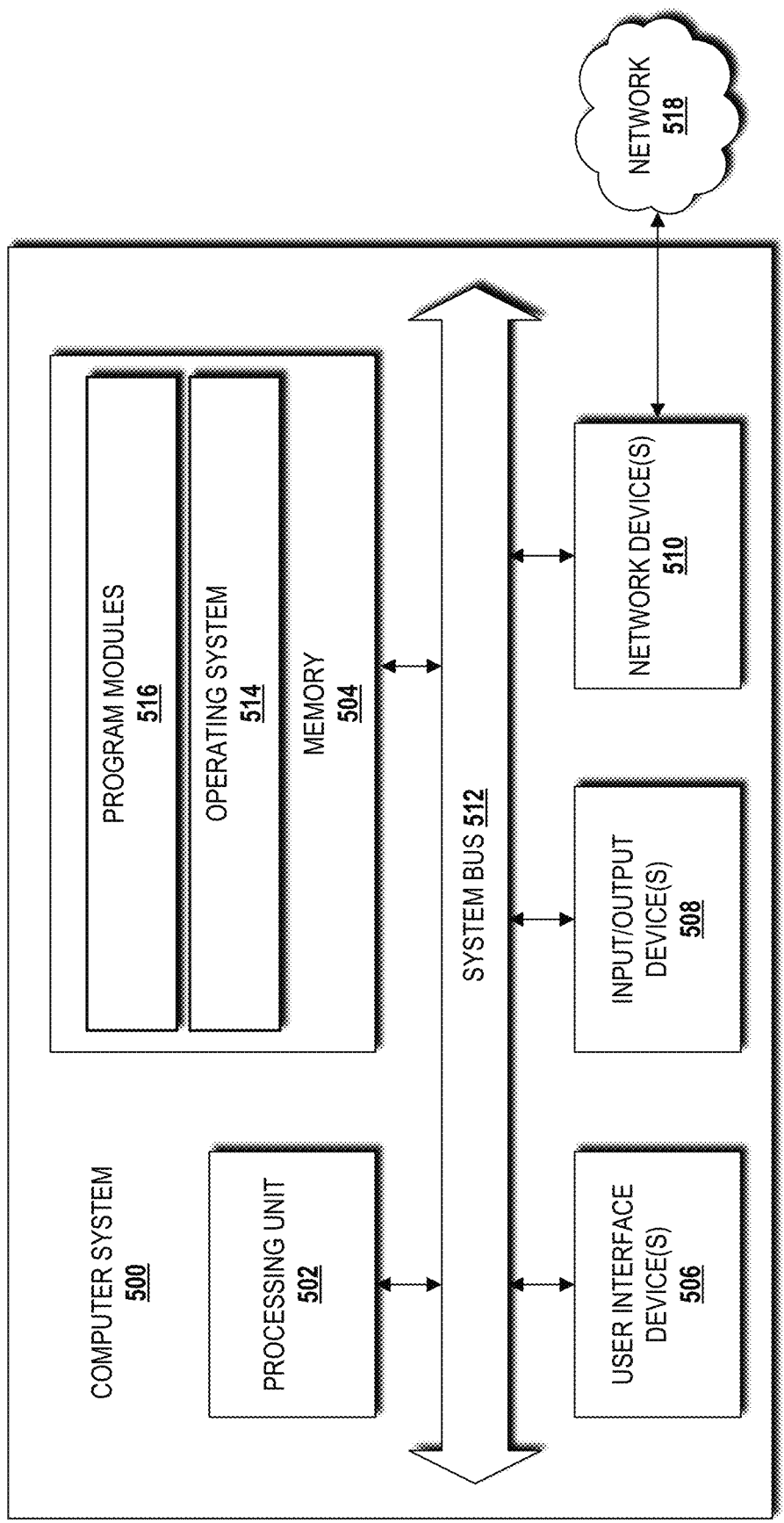
FIG. 5 is a block diagram illustrating an example computer system capable of implementing aspects of the embodiments presented herein.

FIG. 5 is a block diagram illustrating a computer system 500 configured to provide the functionality in accordance with various embodiments of the concepts and technologies disclosed herein. In some embodiments, the homing service system 102, the master service orchestrator 104, the policy system 106, any of the other systems 108, the service architect computer system 140, the customer computer system 152, components of the hardware resource layer 202, and/or any other systems described herein can be configured, at least in part, like the architecture of the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. The program modules 516 and/or other programs can be embodied in computer-readable media containing instructions that, when executed by the processing unit 502, perform various operations such as those described herein. According to embodiments, the program modules 516 may be embodied in hardware, software, firmware, or any combination thereof.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network 518. Examples of the network devices 510 include, but are not limited to, a modem, a radio frequency ("RF") or infrared ("IR") transceiver, a telephonic interface, a bridge, a router, or a network card. The network 518 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 518 may be a wired network such as, but not limited to, a Wide Area Network ("WAN"), a wired Personal Area Network ("PAN"), or a wired Metropolitan Area Network ("MAN"). The network 518 may be any other network described herein.

Figure 6:
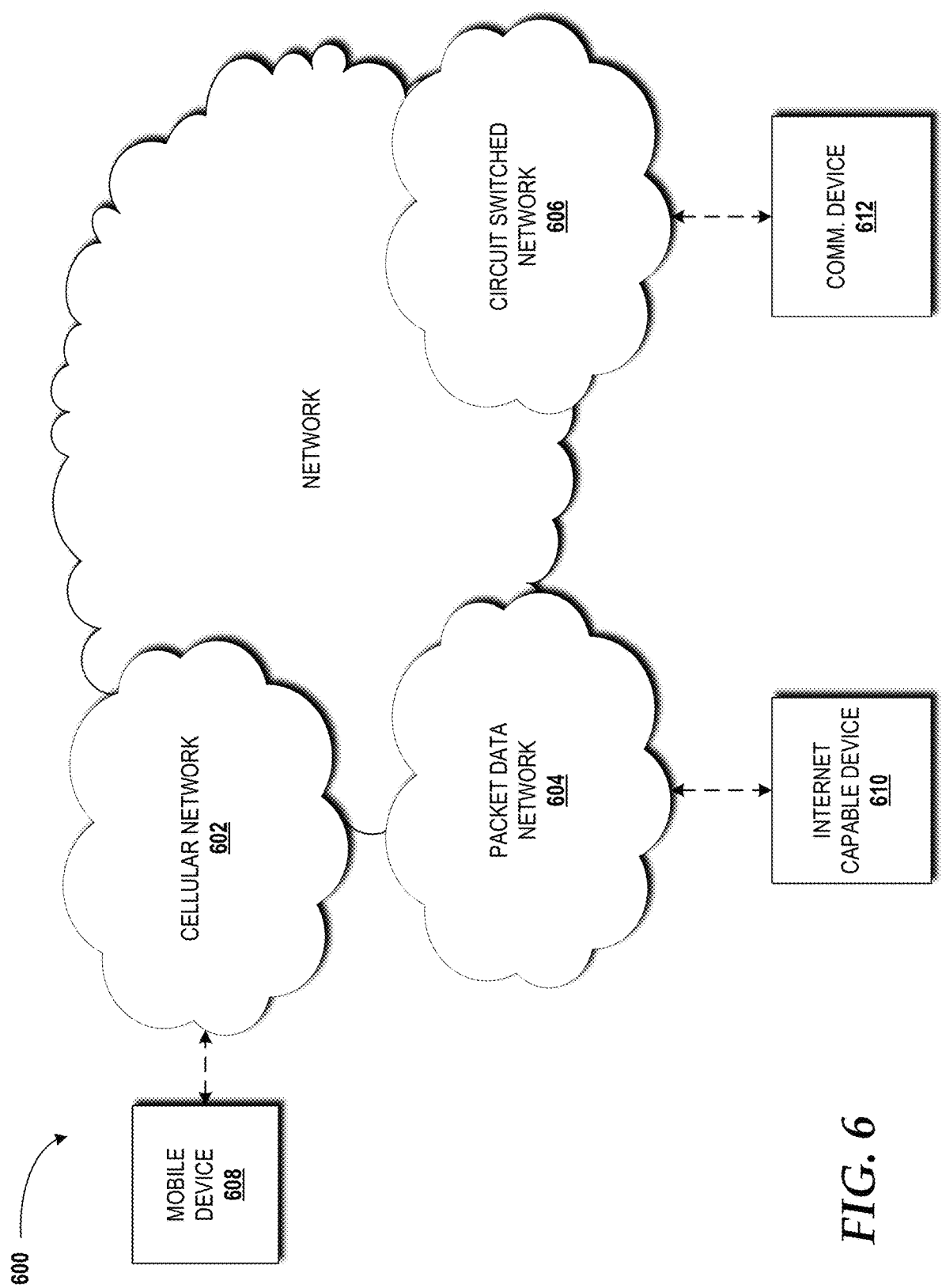
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, for example, the Internet, and a circuit switched network 606, for example, a PSTN. The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. The circuit switched network 606 includes various hardware and software for providing circuit switched communications. The circuit switched network 606 may include, or may be, what is often referred to as a POTS. The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network is used to refer broadly to any combination of the networks 602, 604, 606 shown in FIG. 6.

Based on the foregoing, it should be appreciated that concepts and technologies directed to a policy-driven homing service system have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, by a homing service system comprising a processor, from a master service orchestrator, a set of demands comprising at least two demands, wherein the set of demands specifies a plurality of service components to be used to provide, at least in part, a service;
receiving, by the homing service system, from a policy system, a plurality of homing constraints;
determining, by a homing service solver of the homing service system via execution of a greedy algorithm to determine an optimized homing solution for the set of demands, an initial set of all potential candidates to which to home the plurality of service components;
applying, by the homing service solver of the homing service system via execution of the greedy algorithm, for the set of demands, the plurality of homing constraints to each potential candidate in the initial set of all potential candidates;
determining, by the homing service solver of the homing service system via execution of the greedy algorithm, for the set of demands, a resultant set of potential candidates that satisfy the plurality of homing constraints;
determining, by the homing service solver of the homing service system via execution of the greedy algorithm, for the set of demands, a plurality of best candidates from the resultant set of potential candidates, wherein the optimized homing solution comprises the plurality of best candidates; and
sending, by the homing service system, the optimized homing solution to the master service orchestrator, which homes the set of demands to a plurality of resources associated with the plurality of best candidates in accordance with the optimized homing solution.

2. The method of claim 1, wherein the plurality of service components comprises at least one virtual network function.

3. The method of claim 1, wherein each homing constraint of the plurality of homing constraints comprises a service requirement, an optimization objective, a runtime metric, a runtime query, or a cloud capability.

4. The method of claim 1, wherein receiving, by the homing service system, from the master service orchestrator, the set of demands that specify the plurality of service components to be used to provide, at least in part, the service is responsive to the master service orchestrator receiving a service request from an ordering application executed by a customer computer system.

5. The method of claim 1, wherein receiving, by the homing service system, from the master service orchestrator, the set of demands that specify the plurality of service components to be used to provide, at least in part, the service is responsive to the master service orchestrator receiving a service change request from a customer.

6. A homing service system comprising:
a homing service solver executing a greedy algorithm to determine an optimized homing solution for a demand;
a processor; and
memory comprising computer-executable instructions that, when executed by the processor, cause the processor to perform operations comprising
receiving, from a master service orchestrator, a set of demands comprising at least two demands, wherein the set of demands specifies a plurality of service components to be used to provide, at least in part, a service,
receiving, from a policy system, a plurality of homing constraints,
determining, by the homing service solver via execution of the greedy algorithm, for the set of demands, an initial set of all potential candidates to which to home the plurality of service components,
applying, by the homing service solver via execution of the greedy algorithm, for the set of demands, the plurality of homing constraints to each potential candidate in the initial set of all potential candidates,
determining, by the homing service solver via execution of the greedy algorithm, for the set of demands, a resultant set of potential candidates that satisfy the plurality of homing constraints,
determining, by the homing service solver via execution of the greedy algorithm, for the set of demands, a plurality of best candidates from the resultant set of potential candidates, wherein the optimized homing solution comprises the plurality of best candidates, and
sending the optimized homing solution to the master service orchestrator, which homes the set of demands to a plurality of resources associated with the plurality of best candidates in accordance with the optimized homing solution.

7. The homing service system of claim 6, wherein at least one service component of the plurality of service components comprises a virtual network function.

8. The homing service system of claim 6, wherein each homing constraint of the plurality of homing constraints comprises a service requirement, an optimization objective, a runtime metric, a runtime query, or a cloud capability.

9. The homing service system of claim 6, wherein receiving, from the master service orchestrator, the set of demands that specify the plurality of service components to be used to provide, at least in part, the service is responsive to the master service orchestrator receiving a service request from an ordering application executed by a customer computer system.

10. The homing service system of claim 6, wherein receiving, from the master service orchestrator, the set of demands that specify the plurality of service components to be used to provide, at least in part, the service is responsive to the master service orchestrator receiving a service change request from a customer.

11. A computer-readable storage medium having computer-executable instructions stored thereon that, when executed by a processor, cause the processor to perform operations comprising:
receiving, from a master service orchestrator, a set of demands comprising at least two demands, wherein the set of demands specifies a plurality of service components to be used to provide, at least in part, a service;
receiving, from a policy system, a plurality of homing constraints;
determining, by a homing service solver via execution of a greedy algorithm to determine an optimized homing solution for the set of demands, an initial set of all potential candidates to which to home the plurality of service components;
applying, by the homing service solver via execution of the greedy algorithm, for the set of demands, the plurality of homing constraints to each potential candidate in the initial set of all potential candidates;
determining, by the homing service solver via execution of the greedy algorithm, for the set of demands, a resultant set of potential candidates that satisfy the plurality of homing constraints;
determining, by the homing service solver via execution of the greedy algorithm, for the set of demands, a plurality of best candidates from the resultant set of potential candidates, wherein the optimized homing solution comprises the plurality of best candidates; and
sending the optimized homing solution to the master service orchestrator, which homes the set of demands to a plurality of resources associated with the plurality of best candidates in accordance with the optimized homing solution.

12. The computer-readable storage medium of claim 11, wherein at least one service component of the plurality of service components comprises a virtual network function.

13. The computer-readable storage medium of claim 11, wherein each homing constraint of the plurality of homing constraints comprises a service requirement, an optimization objective, a runtime metric, a runtime query, or a cloud capability.

14. The computer-readable storage medium of claim 11, wherein receiving, from the master service orchestrator, the set of demands that specify the plurality of service components to be used to provide, at least in part, the service is responsive to the master service orchestrator receiving a service request from an ordering application executed by a customer computer system.

15. The computer-readable storage medium of claim 11, wherein receiving, from the master service orchestrator, the set of demands that specify the plurality of service components to be used to provide, at least in part, the service is responsive to the master service orchestrator receiving a service change request from a customer.

16. The computer-readable storage medium of claim 11, wherein the set of demands and the set of homing constraints are comprised in a template.

17. The computer-readable storage medium of claim 11, wherein the service is designed by a service designer who specifies the plurality of service components as required to instantiate an instance of the service.

* * * * *